No. 702,841. Patented June 17, 1902.
W. F. WILLIAMS.
ELLIPTIC CHAIN DRIVING GEAR.
(Application filed June 25, 1901.)
(No Model.) 2 Sheets—Sheet 1.
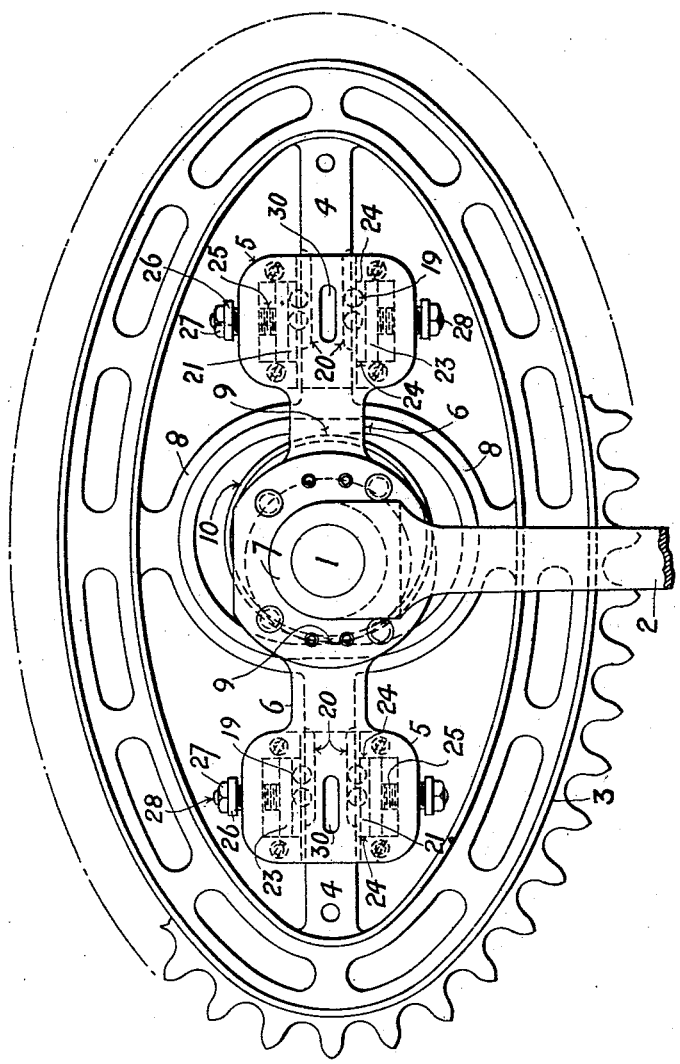
WITNESSES:
W. M. Avery
C. E. Holske
INVENTOR
William F. Williams
BY
ATTORNEYS

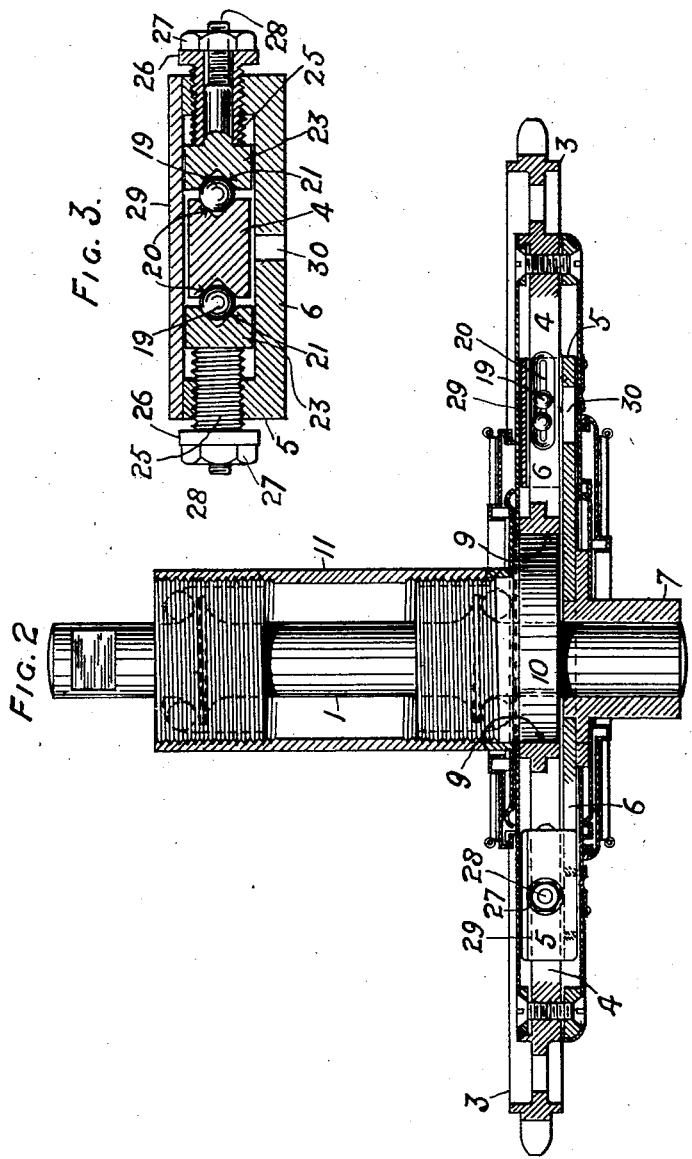

UNITED STATES PATENT OFFICE.

WILLIAM FREDERICK WILLIAMS, OF LONDON, ENGLAND.

ELLIPTIC CHAIN DRIVING-GEAR.

SPECIFICATION forming part of Letters Patent No. 702,841, dated June 17, 1902.

Application filed June 25, 1901. Serial No. 65,926. (No model.)

*To all whom it may concern:*

Be it known that I, WILLIAM FREDERICK WILLIAMS, a resident of 17 and 18 Great Pulteney street, Golden Square, London, England, have invented Improvements in Elliptic Chain Driving-Gear, of which the following is a specification.

My invention relates to improvements in elliptic chain driving-gear of bicycles and tricycles of the kind for which previous Letters Patent were granted to me, dated February 24, 1897, No. 126,447, wherein the ratio of the gearing is varied during each stroke of each pedal by the use of an elliptic sprocket-wheel for the driving-chain and wherein the sprocket-wheel is shifted in the direction of its own plane by the action of a stationary eccentric, so as to accommodate itself to suit the varying length of chain required at different angular positions of the elliptic wheel.

My present improvements have for object to provide for the adjustment of the rectilinear ball-bearings used to diminish the friction between the arms of the elliptic sprocket-wheel and the corresponding arms on the pedal-crank.

Reference is to be had to the accompanying drawings, wherein—

Figure 1 is an outside face view of the elliptic sprocket-wheel. Fig. 2 is a section of the same, taken in the plane of the major axis; and Fig. 3 is an enlarged transverse section through one of the rectilinear ball-bearings of the elliptical sprocket-wheel.

Similar reference-numerals denote like parts in all the figures.

1 is the crank-axle.

2 is one of the pedal-cranks.

3 is the elliptic sprocket-wheel, connected with the crank-axle 1 (so as to turn therewith, but adapted to move in its own plane in the direction of its major axis relatively to the crank-axle) by the sliding engagement of arms 4 4, situated on the major axis, with guide-bearing brackets 5 5, carried by a pair of arms 6 6, fast with the boss 7 of the pedal-crank 2. The arms 4 may be stayed, as at 8 8, by transverse arms or curved brackets from the rim of the wheel, as shown, and the arms 4 terminate at their inner ends in abutment or guide surfaces 9 9, parallel to and equidistant from the minor axis of the wheel, these surfaces embracing between them the periphery of a stationary eccentric 10, fast with the bracket 11 of the machine-frame, in which the crank-axis has its bearings, as usual. By the revolution of the sprocket-wheel about the stationary eccentric the sprocket-wheel will be caused to receive a to-and-fro traversing motion in its own plane toward and away from the other wheel to be driven by the chain.

In order to diminish friction between the arms 4 of the elliptical wheel and their bearings in the brackets 5, balls 19 are interposed between the relatively moving surfaces of the arm 4 and its bearings, the balls being retained in V-grooved races 20 21, respectively formed in the opposite sides of each arm 4 and in bearing-blocks 23, fitted one at either side of the arm 4 in the bracket 5, as hereinafter described, there being preferably two or more balls comprised in each set. By means of the ball-bearings thus formed the arms 4 slide without rubbing friction through the brackets 5 5, all relative lateral motion—*i. e.,* shake or motion perpendicular to the plane of the wheel—being prevented, while the freest possible longitudinal motion of the arms is permitted, at the same time that a secure driving connection is maintained between the crank-axle 1 and the wheel 3. In order to prevent the balls working out, the ends of the grooved races 20 21, respectively, are closed at the limits of the intended range of motion—in the one case by the grooves 20 being recessed of the required length in the edges of the arm 4 and in the other case by the ends 24 of the brackets 5, (between which ends the blocks 23 are confined,) forming stops. In order to provide means of adjustment whereby to enable wear of the balls and their races to be taken up, the blocks 23 are fitted to slide within the box-like bracket 5 and between the parallel faces of the end walls 24 thereof, and each block is pressed forward by a screw-threaded sleeve 25, working through a hole tapped in the outer wall of the bracket, the inner end of the sleeve abutting against the back of the block 23 and its outer end being provided with a head or flange 26, notched or otherwise adapted to be turned by a spanner or other suitable tool. The screw adjustment is locked by means of a locking-nut 27, applied to the outer threaded end of a stem 28, integral with the back of the block 23 and passing axially through the screwed sleeve 25, against the outer end of which the locking-nut bears. The box-like bracket 5 is completed by a cover-plate 29, fixed by screws upon its open side, so as to inclose the working parts and brace together the outer walls, so as to enable them to resist the driving strain. 30 is an oiling-slot in the front wall of the box 5.

I claim—

1. In rectilinear ball-bearings constituted by a pair of opposed grooves with interposed balls, the combination with a grooved block forming the one ball-race and fitted in a holder so as to be adjustable toward and away from the other ball-race, of a tubular set-screw screwing through the holder and bearing against the back of the adjustable block so as to hold said block unyieldingly up to its work, a screw-threaded stem attached to the block and passing through the tubular set-screw, and a lock-nut screwing on said stem and bearing against the end of the tubular set-screw so as to lock the block in the position to which it has been brought by said set-screw, substantially as specified.

2. In an elliptical chain driving-gear, the combination of a pedal-crank, an elliptical sprocket-wheel having diametrical arms, grooves in the opposite sides of the said arms, oppositely-extending driving-arms secured to the boss of the pedal-crank and carrying guide-brackets, bearing-blocks fitted one in each bracket at opposite sides of the arms of the sprocket-wheel so as to be capable of adjustment toward and away from the sprocket-wheel arms and each provided with a groove of V-section registering with a groove of similar section in the arm, balls in the races formed by said grooves, a tubular set-screw screwing through each bracket and bearing against the adjustable block therein so as to unyieldingly hold said block up to its work, a screw-threaded stem attached to each adjustable block and passing through the tubular set-screw and a lock-nut screwing on each said stem and bearing against the corresponding set-screw so as to enable the correct position of the sprocket-wheel relatively to its driving-arms to be maintained in all positions of adjustment.

WILLIAM FREDERICK WILLIAMS.

Witnesses:
W. M. HARRIS,
WALTER J. SKERTEN.